US009523897B2

(12) United States Patent
Hyodo et al.

(10) Patent No.: US 9,523,897 B2
(45) Date of Patent: Dec. 20, 2016

(54) LIQUID CRYSTAL DISPLAY DEVICE

(71) Applicant: Japan Display Inc., Tokyo (JP)

(72) Inventors: Yosuke Hyodo, Tokyo (JP); Yasushi Tomioka, Tokyo (JP); Noboru Kunimatsu, Tokyo (JP); Hidehiro Sonoda, Tokyo (JP); Yasuo Imanishi, Tokyo (JP); Takenori Hirota, Tokyo (JP)

(73) Assignee: Japan Display Inc., Tokyo (JP)

( * ) Notice: Subject to any disclaimer, the term of this patent is extended or adjusted under 35 U.S.C. 154(b) by 95 days.

(21) Appl. No.: 14/542,912

(22) Filed: Nov. 17, 2014

(65) Prior Publication Data

US 2015/0138476 A1    May 21, 2015

(30) Foreign Application Priority Data

Nov. 18, 2013  (JP) ................. 2013-238130

(51) Int. Cl.
| | |
|---|---|
| *G02F 1/1362* | (2006.01) |
| *G02F 1/1333* | (2006.01) |
| *G02F 1/1339* | (2006.01) |
| *G02F 1/1368* | (2006.01) |
| *G02F 1/1337* | (2006.01) |

(52) U.S. Cl.
CPC ....... *G02F 1/136227* (2013.01); *G02F 1/1337* (2013.01); *G02F 1/133345* (2013.01)

(58) Field of Classification Search
None
See application file for complete search history.

(56) References Cited

U.S. PATENT DOCUMENTS

| | | | |
|---|---|---|---|
| 2007/0279564 A1 | 12/2007 | Iwato et al. | |
| 2012/0268678 A1 | 10/2012 | Tomioka et al. | |
| 2013/0126876 A1* | 5/2013 | Shin .................... | H01L 29/6675 257/59 |
| 2015/0092144 A1* | 4/2015 | Lee ....................... | G02F 1/1333 349/123 |
| 2015/0138481 A1* | 5/2015 | Yamayoshi ......... | H01L 27/1288 349/46 |

FOREIGN PATENT DOCUMENTS

| | | |
|---|---|---|
| JP | 2007-322563 A | 12/2007 |
| JP | 2008-275879 A | 11/2008 |
| JP | 2013-140386 A | 7/2013 |

* cited by examiner

*Primary Examiner* — Ashok Patel
(74) *Attorney, Agent, or Firm* — Typha IP LLC (57) ABSTRACT

To take measures against the phenomenon of difficulty for the orientation film material to flow into the through-hole when the diameter of through-holes which connects the pixel electrode and the source electrode becomes small.
An interlayer insulating film 109 made of SiN is formed on a counter electrode, and a pixel electrode 110 having a slit 1101 is formed on the interlayer insulating film 109. A through-hole 111 which connects the pixel electrode 110 and the source electrode of a TFT has a large opening on the upper side, a small opening on the lower side, and an inner wall extending between the large opening and the small opening. The pixel electrode 110 covers the through-hole 111 on an inner side of the pixel of the through-hole 111 but does not cover a periphery of the large opening of the through-hole on an outer side of the through-hole 111. Consequently, an orientation film material can easily flow from a starting point given by an end portion of the pixel electrode into the inside of the through-hole.

5 Claims, 11 Drawing Sheets

LIQUID CRYSTAL DISPLAY DEVICE

CLAIM OF PRIORITY

The present application claims priority from Japanese Patent Application JP 2013-238130 filed on Nov. 18, 2013, the content of which is hereby incorporated by reference into this application.

BACKGROUND OF THE INVENTION

1. Field of the Invention

The present invention relates to a display device, and particularly to a liquid crystal display device which is small in decrease in transmittance and low in pixel defect rate even on a high definition screen.

2. Description of the Related Art

In a liquid crystal display device, liquid crystal is sandwiched between a thin film transistor (TFT) substrate and a counter substrate. The TFT substrate has pixels formed in a matrix thereon and each including a pixel electrode, a TFT and so forth. The counter substrate opposed to the TFT substrate has color filters formed at places thereof corresponding to the pixel electrodes of the TFT substrate. The transmittance of light by liquid crystal molecules is controlled for each pixel to form an image. It is to be noted that a pixel signifies a region surrounded by each of scanning lines extending in a first direction and arrayed in a second direction and each of video signal lines extending in the second direction and arrayed in the first direction.

Since a liquid crystal display device is flat and light in weight, applications thereof are spreading in various fields. In portable telephone sets, digital still cameras (DSCs) and so forth, a liquid crystal display device of a small size is used widely. In a liquid crystal display device, the viewing angle characteristic matters. The viewing angle characteristic is a phenomenon in which the luminance varies or the chromaticity varies depending upon whether a screen image is viewed from the front or from an oblique direction. An in-plane switching (IPS) method wherein liquid crystal molecules are operated by an electric field applied in a horizontal direction is superior in the viewing angle characteristic.

Among various IPS methods, some methods have become the mainstream today because the transmittance can be increased. The increased transmittance can be realized by, for example, forming a common electrode solidly in plane and disposing pixel electrodes having a slit above the common electrode with an insulating film interposed therebetween such that liquid crystal molecules can be rotated by an electric field generated between the pixel electrodes and the common electrode. The common electrode and the interlayer insulating film are formed on an organic passivation film which serves also as a flattening film.

On the other hand, if the size of the pixels on a high definition screen of a liquid crystal display device is reduced, then the proportion of the diameter of through-holes for connecting the pixel electrodes and the source electrodes of the TFTs to each other increases.

If it is tried to decrease also the diameter of the through-holes as the pixel size is decreased to raise the definition of the screen, then the taper angle of a wall portion of the through-holes (such taper angle is hereinafter referred to sometimes as taper angle of a through-hole) must be increased. Meanwhile, although an orientation film is used in order to initially orient the liquid crystal, a material for the orientation film is applied by flexographic printing, ink jet printing or the like while it initially (before the application) remains in a liquid state.

If the taper angle of a through-hole is increased, then when the orientation film material is applied, a phenomenon occurs in which the orientation film material does not advance into the through-hole due to the surface tension thereof. If the phenomenon occurs, then since the state of liquid crystal differs in a region in which the orientation film is formed thicker, some display irregularities occur there due to leak of light therethrough or the like.

JP-2007-322563-A discloses a configuration wherein the height is changed around a large opening on an upper side of a through-hole so that an orientation film may flow readily into the through-hole. The method of changing the height around a large opening on an upper side of a through-hole in the above-specified patent document is configured such that a step provided on a lower layer film is reflected on the circumference of the large opening on the upper side of the through-hole.

JP-2008-275879-A discloses a configuration for solving a problem that photoresist for formation of pixel electrode patterns does not advance into a recessed portion of a through-hole and a pixel electrode is etched in the through-hole, resulting in failure to establish electric connection of the pixel electrode. In particular, JP-2008-275879-A discloses a configuration wherein a step is provided around a large opening on the upper side of a through-hole so as to facilitate advancement of photoresist into the through-hole. Alto it is disclosed that a similar problem occurs also with application of an orientation film material. Also the method of changing the height around a large opening on the upper side of a through-hole in the above-specified patent document is configured such that a step provided on a lower layer film is reflected on a periphery of the large opening on the upper side of the through-hole.

JP-2013-140386-A discloses a configuration wherein, in a liquid crystal display device of the IPS type, an optical orientation process is used for an orientation film to use also an inner wall of a through-hole as a region for formation of an image. To this end, the above-specified patent document discloses a configuration wherein, also on an inner wall of a through-hole, a slit of a pixel electrode is formed.

SUMMARY OF THE INVENTION

Recently, also for a liquid crystal display device of a small size, such a high definition screen as video graphics array (VGA, 640×480 dots) is demanded. Here, since a dot is formed from a set of three pixels of a red pixel, a green pixel and a blue pixel, where the high definition screen is represented using a pixel number, then it includes 1920×480 pixels. In order to make it possible to display a VGA image on a screen of three inches, the minor diameter of a pixel becomes as small as 32 μm.

In order to maintain a predetermined transmittance even if the pixel size becomes small, it is necessary to dispose a TFT, a through-hole and so forth in a small area and raise the proportion of the area of the pixel electrode as high as possible. If it is tried to reduce the area occupied by the through-hole, then the taper angle of the through-hole increases. Such increase of the taper angle makes an orientation film material less liable to flow into the through-hole, resulting in occurrence of a sesame-like pixel defect.

The configuration of JP-2007-322563-A or JP-2008-275879-A is that a step is provided on a lower layer film and is reflected on a circumference of a large opening on the upper side of a through-hole. Therefore, if it is tried to provide a difference in height around an upper portion of a through-hole, then it becomes impossible to use an organic passivation film. This is because, since the organic passivation film is formed as thick as 2 to 4 μm, the surface becomes flat and it becomes difficult to form a difference in height around the through-hole.

On the other hand, depending upon the type of the liquid crystal display device, it is necessary to use an organic passivation film from the request that the thickness of the liquid crystal layer be fixed. Further, since the organic passivation film is formed as thick as 2 to 4 μm, if a through-hole is formed in the organic passivation film, then the problem that the area occupied by the through-hole increases becomes further prominent.

Figure 14:
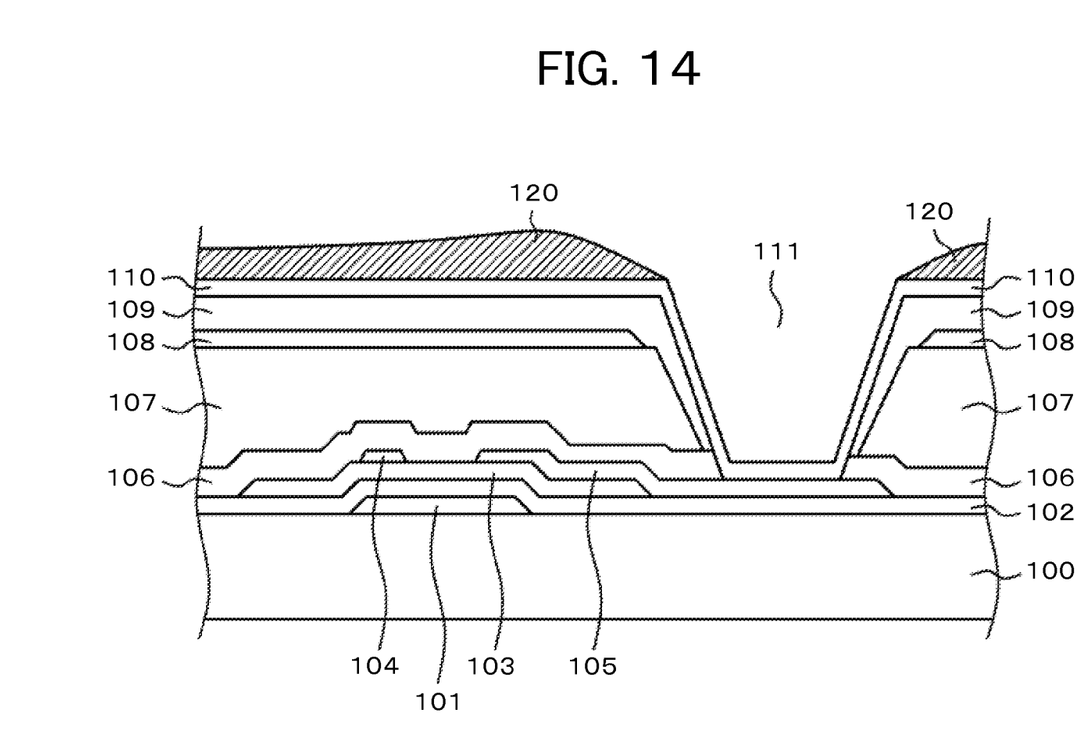
FIG. 14 is a cross sectional view of a through-hole illustrating a problem of a conventional configuration.

FIG. 14 is a sectional view illustrating the problem described above in a liquid crystal display device of the IPS type. Referring to FIG. 14, a gate electrode 101 is formed on a TFT substrate 100, and a gate insulating film 102 is formed so as to cover the gate electrode 101. A semiconductor layer 103 is formed at a location on the gate insulating film 102 corresponding to the gate electrode 101. A drain electrode 104 and a source electrode 105 are laminated on the semiconductor layer 103. An inorganic passivation film 106 is formed so as to cover the semiconductor layer 103, drain electrode 104, source electrode 105 and so forth and protects the TFT. An organic passivation film 107 serving also as a flattening film is formed on the inorganic passivation film 106. The organic passivation film 107 is formed as thick as 2 to 4 μm.

A counter electrode 108 to which a common voltage is applied is formed on the organic passivation film 107. An interlayer insulating film 109 made of SiN is formed so as to cover the counter electrode 108 (also called common electrode). A pixel electrode 110 having a slit not depicted is formed on the interlayer insulating film 109. The pixel electrode 110 is connected to the source electrode 105 which extends from the TFT through a through-hole 111 formed in the interlayer insulating film 109, organic passivation film 107 and inorganic passivation film 106.

An orientation film 120 is applied on the pixel electrode 110 by flexographic printing, ink jet printing or the like. However, if the diameter of the through-hole 111 becomes small, then the taper angle of the through-hole 111 becomes great, which gives rise to a phenomenon in which the orientation film material which initially is liquid does not advance into the through-hole. This gives rise to another phenomenon in which the orientation film 120 is formed thick on a periphery of the through-hole 111 as depicted in FIG. 14.

If an unevenness in thickness occurs with the orientation film 120 in this manner, then since the state of the liquid crystal at the place becomes different from that in the other region, display irregularities occur. Such a phenomenon in which the thickness of the orientation film 120 increases around the through-hole 111 because the orientation film material does not advance into the through-hole 111 frequently occurs not only around one pixel 10 but also with a plurality of pixels 10 as indicated by slanting line regions in FIG. 15. The display irregularities are likely to become prominent as much.

Figure 15:
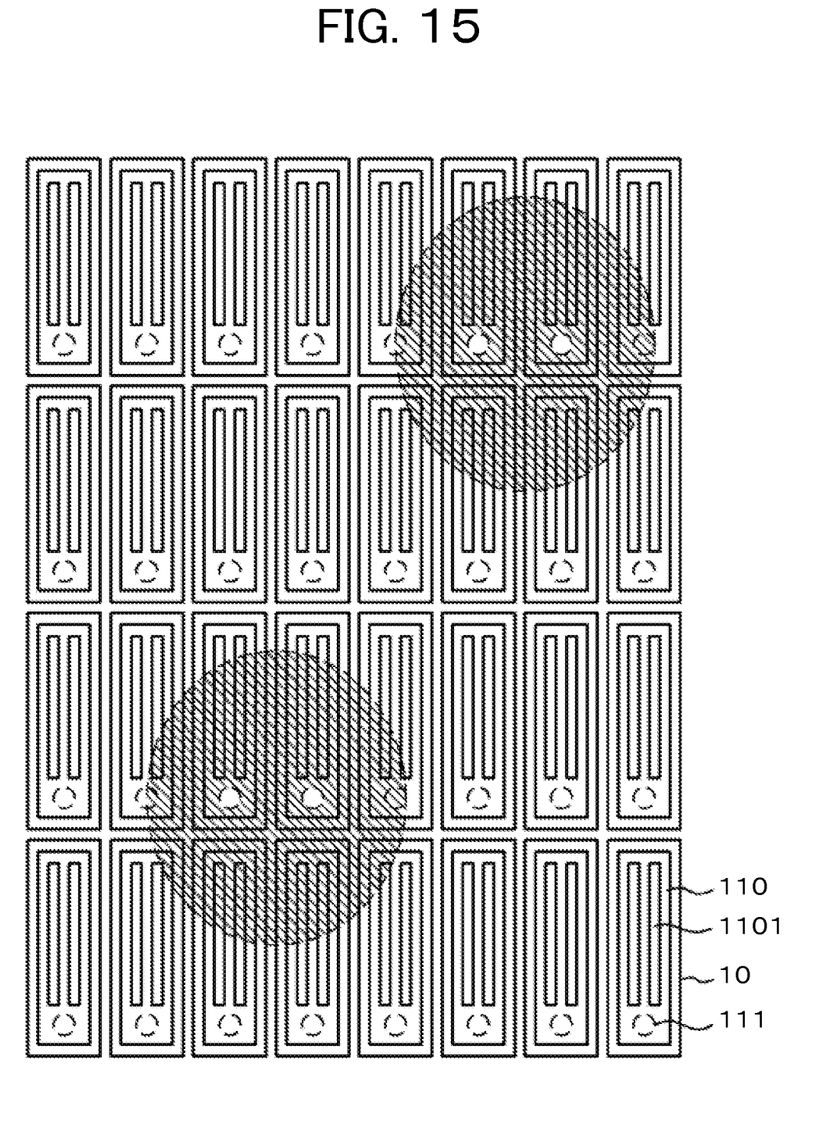
FIG. 15 is a plan view of a display region illustrating the problem of the conventional configuration.

Referring to FIG. 15, pixels 10 having the pixel electrode 110 are formed in a matrix. The pixel electrode 110 has a slit 1101 and is connected to the source electrode of a TFT not depicted through the through-hole 111. The through-hole 111 extends through an interlayer insulating film, an organic passivation film and an inorganic passivation film. The pixel electrode 110 covers the entire through-hole 111.

Figure 16:
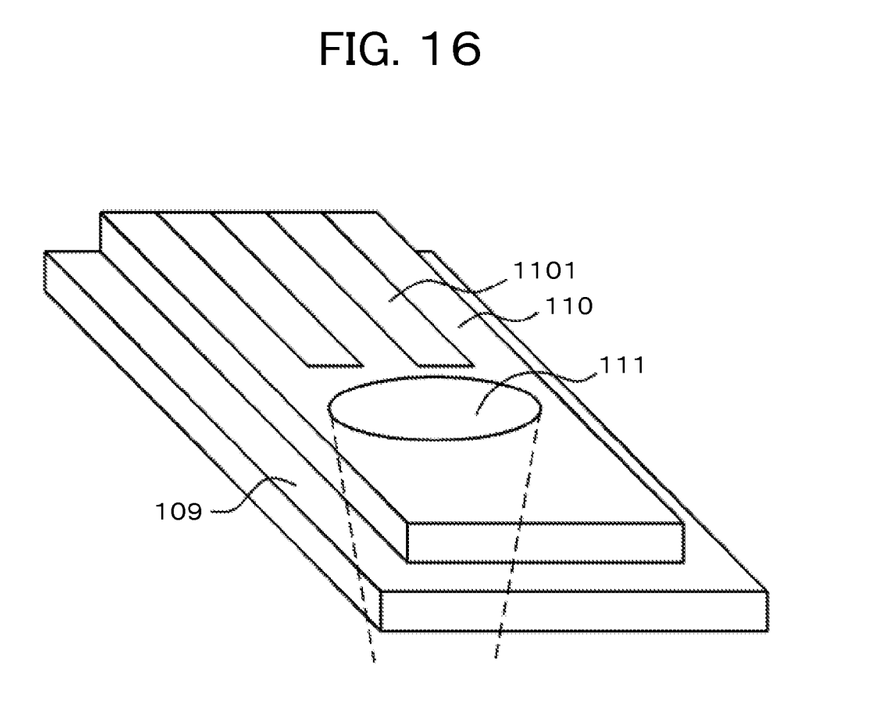
FIG. 16 is a perspective view depicting a pixel structure of a conventional configuration.

FIG. 16 is a perspective view depicting part of a pixel. Referring to FIG. 16, the pixel electrode 110 is formed on the interlayer insulating film 109 made of SiN. The pixel electrode 110 is made of indium tin oxide (ITO) and has the slit 1101 therein. The pixel electrode 110 covers the entire through-hole 111. An orientation film material is applied to the pixel electrode 110. However, if the diameter of the through-hole 111 becomes small, then a phenomenon occurs in which the orientation film material does not advance into the through-hole 111 and the orientation film 120 is formed thick on a periphery of the through-hole as depicted in FIG. 14.

It is a subject of the present invention to provide a liquid crystal display device wherein, even if the size of pixels is small on a high definition screen and also the diameter of through-holes is small, an orientation film material can flow readily into the through-holes thereby to prevent thickness irregularities of the orientation film to allow display of a screen image of high picture quality.

The present invention overcomes the problem described above and provides the following particular means.

(1) According to an embodiment of the present disclosure, there is provided a liquid crystal display device including a TFT substrate, a counter substrate, and liquid crystal sandwiched between the TFT substrate and the counter substrate. The TFT substrate includes an organic passivation film, a common electrode formed on the organic passivation film, an interlayer insulating film formed on and covering the common electrode, a pixel electrode formed on the interlayer insulating film and having therein a slit closed at an end portion thereof, and a pixel. The pixel is configured such that a source electrode of the TFT and the pixel electrode are electrically connected to each other through a through-hole formed in the organic passivation film and the interlayer insulating film. The counter substrate has a color filter at a portion thereof corresponding to the pixel. The through-hole has a large opening on an upper side, a small opening on a lower side which connects to the source electrode, and an inner wall extending between the large opening and the small opening. The pixel electrode covers the through-hole on an inner side of the pixel of the through-hole but does not cover a periphery of the large opening of the through-hole on an outer side of the pixel.

(2) According to another embodiment of the present disclosure, there is provided a liquid crystal display device including a TFT substrate, a counter electrode, and liquid crystal sandwiched between the TFT substrate and the counter substrate. The TFT substrate includes an organic passivation film, a common electrode formed on the organic passivation film, an interlayer insulating film formed on and covering the common electrode, a pixel electrode formed on the interlayer insulating film and having therein a slit closed at an end portion thereof, and a pixel. The pixel is configured such that a source electrode of the TFT and the pixel electrode are electrically connected to each other through a through-hole formed in the organic passivation film and the interlayer insulating film. The counter substrate has a color filter at a portion thereof corresponding to the pixel. The through-hole has a large opening on an upper side, a small opening on a lower side which connects to the source electrode, and an inner wall extending between the large opening and the small opening. A shape in plan of the large opening has a major axis and a minor axis. The pixel has a rectangular shape. The major axis of the large opening of the through-hole extends in a direction same as a direction of the major axis of the pixel. The slit extends also to the inner wall of the through-hole.

(3) According to a further embodiment of the present disclosure, there is provided a liquid crystal display device including a TFT substrate, a counter substrate, and liquid crystal sandwiched between the TFT substrate and the counter substrate. The TFT substrate includes an organic passivation film, a common electrode formed on the organic passivation film, an interlayer insulating film formed on and covering the common electrode, a pixel electrode formed on the interlayer insulating film and having therein a slit closed at an end portion thereof, and a pixel. The pixel is configured such that a source electrode of the TFT and the pixel electrode are electrically connected to each other through a through-hole formed in the organic passivation film and the interlayer insulating film. The counter substrate has a color filter at a portion thereof corresponding to the pixel. The through-hole has a large opening on an upper side, a small opening on a lower side which connects to the source electrode, and an inner wall extending between the large opening and the small opening. A shape in plan of the large opening has a major axis and a minor axis. The pixel electrode includes a main pixel electrode having the slit and a sub pixel electrode disposed so as to have a gap from the main pixel electrode. The pixel has a rectangular shape. The major axis of the large opening of the through-hole extends in a direction same as a direction of the minor axis of the pixel. In a region of the gap, a periphery of the large opening of the through-hole is not covered with the pixel electrode.

(4) According to a still further embodiment of the present disclosure, there is provided a liquid crystal display device including a TFT substrate, a counter substrate, and liquid crystal sandwiched between the TFT substrate and the counter substrate. The TFT substrate includes an organic passivation film, a common electrode formed on the organic passivation film, an interlayer insulating film formed on and covering the common electrode, a pixel electrode formed on the interlayer insulating film and having therein a slit closed at an end portion thereof, and a pixel. The pixel is configured such that a source electrode of the TFT and the pixel electrode are electrically connected to each other through a through-hole formed in the organic passivation film and the interlayer insulating film. The counter substrate has a color filter at a portion thereof corresponding to the pixel. The through-hole has a large opening on an upper side, a small opening on an lower side which connects to the source electrode, and an inner wall extending between the large opening and the small opening. The small opening of the through-hole is eccentric with respect to the large opening.

(5) According to a yet further embodiment of the present disclosure, there is provided a liquid crystal display device including a TFT substrate, a counter substrate, and liquid crystal sandwiched between the TFT substrate and the counter substrate. The TFT substrate includes an organic passivation film, a common electrode formed on the organic passivation film, an interlayer insulating film formed on and covering the common electrode, a pixel electrode formed on the interlayer insulating film and having therein a slit closed at an end portion thereof, and a pixel. The pixel is configured such that a source electrode of the TFT and the pixel electrode are electrically connected to each other through a through-hole formed in the organic passivation film and the interlayer insulating film. The counter substrate has a color filter at a portion thereof corresponding to the pixel. A distance between the TFT substrate and the counter substrate is defined by post-like spacers formed on the counter sub-strate. The through-hole has a large opening on an upper side, a small opening on a lower side which connects to the source electrode, and an inner wall extending between the large opening and the small opening. The small opening of the through-hole is eccentric to the post-like spacer side nearest to the through-hole with respect to the large opening.

With the liquid crystal display devices of the present invention wherein a high definition screen is provided and a pixel has a reduced area and besides an organic passivation film is used on a TFT substrate, even if a through-hole diameter is reduced, a liquid crystal orientation film material can be formed stably in the through-hole. Accordingly, display irregularities arising from the fact that the orientation film does not exist in the through-hole or arising from irregularities in thickness of the orientation film on a periphery of the through-hole can be prevented.

DESCRIPTION OF THE PREFERRED EMBODIMENTS

In the following, the present invention is described in detail in connection with embodiments thereof.

[Embodiment 1]

Figure 1:
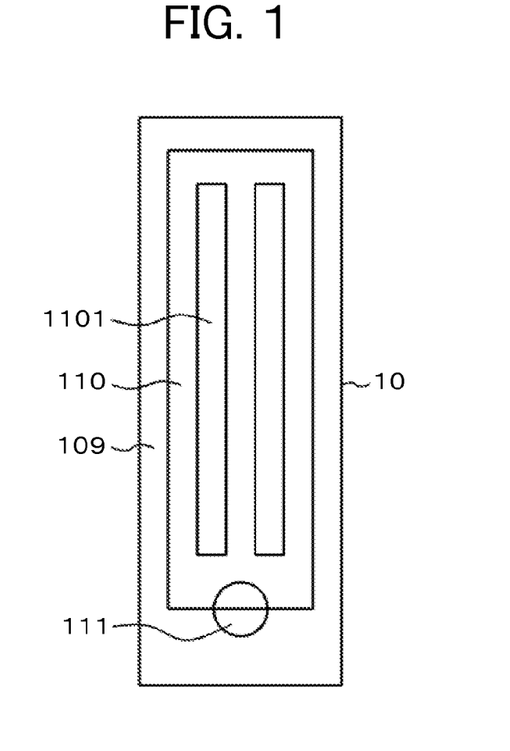
FIG. 1 is a top plan view of a pixel of a liquid crystal display device according to an embodiment 1.

FIG. 1 depicts a pixel 10 according to the present invention. Referring to FIG. 1, a pixel electrode 110 having a slit 1101 is formed on an interlayer insulating film 109 made of SiN. A counter substrate not depicted is formed below the interlayer insulating film 109. If a signal voltage is applied to the pixel electrode 110, then electric lines of force are directed through the slit 1101 of the pixel electrode 110 to the underlying counter electrode. Thereupon, a transverse electric field is formed in a liquid crystal layer, and liquid crystal molecules are rotated by the transverse electric field. The transmittance of the liquid crystal is controlled thereby for each pixel 10 to form an image.

Figure 2:
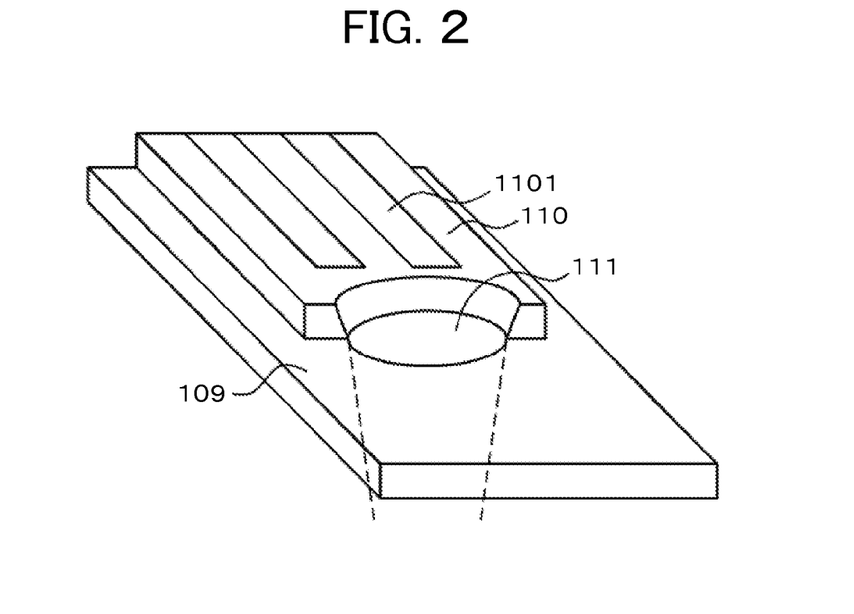
FIG. 2 is a perspective view of the pixel depicted in FIG. 1.

The pixel electrode 110 is connected to the source electrode of a TFT through a through-hole 111. However, the present invention is characterized in that the pixel electrode 110 does not cover the entire through-hole 111 and, on the outer side of the pixel, the pixel electrode 110 does not exist in the proximity of the through-hole 111. FIG. 2 illustrates this manner using a perspective view. Referring to FIG. 2, the pixel electrode 110 having the slit 1101 is formed on the interlayer insulating film 109. However, the pixel electrode 110 is formed only on the inner side of the pixel 10 on the upper side of the through-hole 111 but is not formed on the outer side of the pixel 10.

Consequently, on a periphery of the upper side of the through-hole 111, a step of a dimension corresponding to the thickness of the ITO is formed. If a step is formed on the upper side of the through-hole 111, then an orientation film material which is in the form of liquid is likely to flow into the through-hole 111 from a starting point given by the step. Further, the orientation film material is more likely to get wet and spread on ITO which configures the pixel electrode than on SiN which configures the interlayer insulating film 109. Accordingly, the orientation film material is likely to flow into the through-hole 111 from the side on which the ITO film does not exist, namely, from the outer side of the pixel 10. By such two phenomena, in the present invention, the orientation film material is likely to flow into the through-hole 111.

Figure 3:
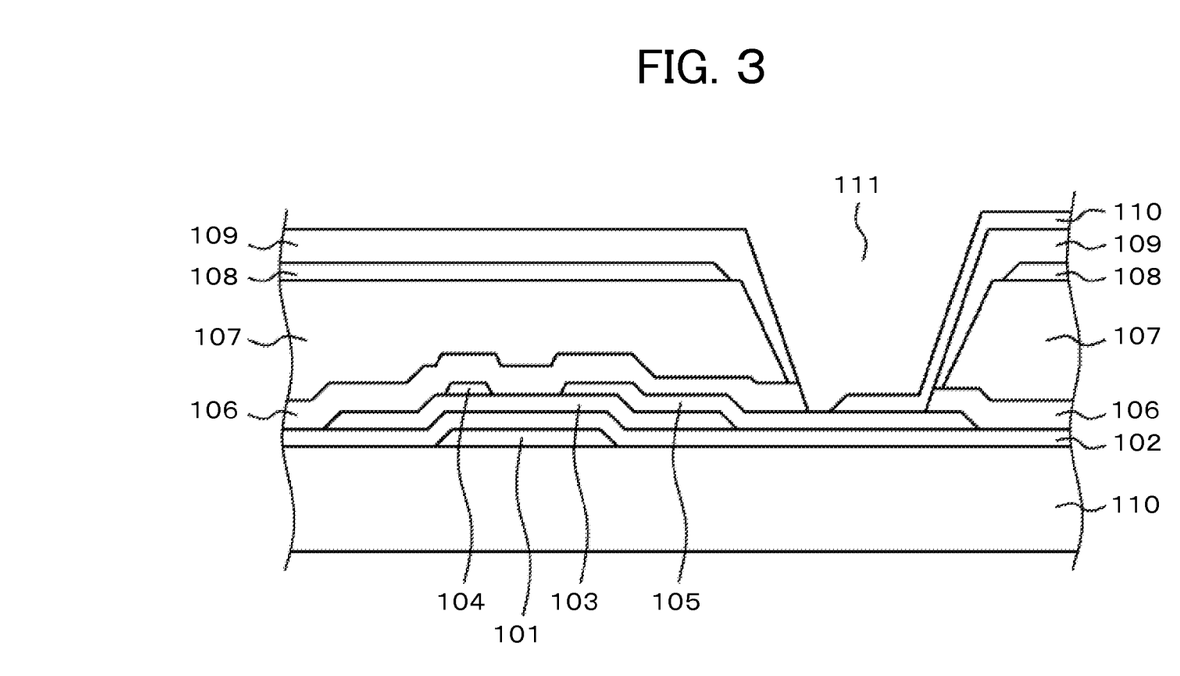
FIG. 3 is a cross sectional view of a through-hole in the pixel depicted in FIG. 1.

FIG. 3 is a sectional view of a pixel including the TFT and the through-hole 111 in the present embodiment. Referring to FIG. 3, the configuration until the interlayer insulating film 109 is formed is similar to that in FIG. 14, and therefore, overlapping description of the same is omitted herein. The present invention is characterized in that the pixel electrode 110 formed on the interlayer insulating film 109 is formed only on one side of the through-hole 111 while the pixel electrode 110 is not formed on the opposite side of the through-hole 111.

The left side in FIG. 3 on which the TFT is formed corresponds to the outer side of the pixel while the right side in FIG. 3 corresponds to the inner side of the pixel. In FIG. 3, the pixel electrode 110 is formed in the through-hole 111 on the inner side of the pixel and is connected to the source electrode 105. In the proximity of the inner wall and the upper side of the through-hole 111 on the outer side of the pixel in FIG. 3, the pixel electrode 110 is not formed and the interlayer insulating film 109 is exposed. Since an orientation film material is more likely to get wet and spread on SiN which configures the interlayer insulating film 109 than on ITO which configures the pixel electrode 110, the orientation film material flows into the through-hole 111 from the outer side of the pixel. Consequently, the thickness irregularities of the orientation film can be suppressed.

[Embodiment 2]

Figure 4:
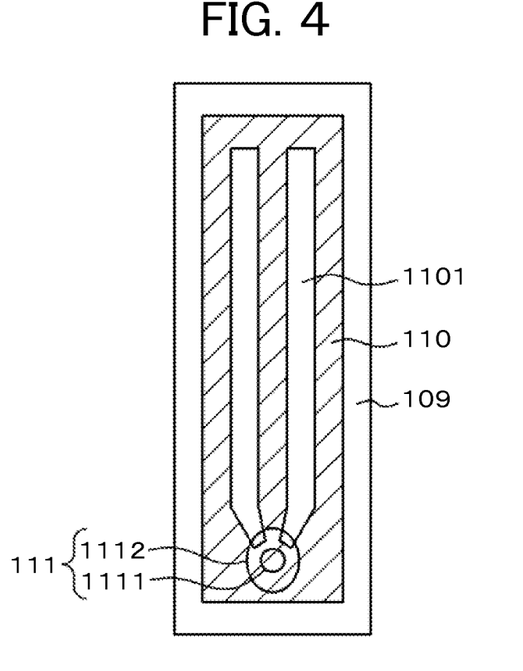
FIG. 4 is a top plan view of a pixel of a liquid crystal display device according to an embodiment 2.

FIG. 4 is a top plan view of a pixel depicting a second embodiment of the present invention. A through-hole 111 has a large opening 1112 and a small opening 1111. The pixel in FIG. 4 is characterized in that the large opening 1112 of the through-hole 111 has an elliptical shape having a major axis in the longitudinal direction of the pixel. Accordingly, in the sectional shape of the through-hole 111, the taper angle of a cross section in the major axis direction of the pixel is smaller than the taper angle of a cross section in the minor axis direction of the pixel.

Further, FIG. 4 is characterized in that a slit 1101 of the pixel electrode 110 extends to the inner wall of the through-hole 111. Accordingly, on a periphery of the upper side of the through-hole 111, a step arising from the presence of the slit 1101 of the pixel electrode 110 is formed. An orientation film material flows readily into the through-hole from a starting point given by the step.

Further, the taper angle of the through-hole 111 on the side on which the slit 1101 of the pixel electrode 110 is formed is smaller. As the tape angle decreases, the orientation film material becomes more likely to flow into the through-hole 111. In particular, in the present embodiment, the upper side of the through-hole 111, namely, the large opening 1112, is formed in an elliptical shape and besides the slit 1101 is extended to the inner wall of the through-hole 111 so that the orientation film material becomes more likely to flow into the through-hole 111 from such two reasons as described above. Consequently, display irregularities arising from thickness irregularities of the orientation film can be prevented.

It is to be noted that, in the configuration of the present embodiment, the shape of the large opening 1112 of the through-hole 111 is not limited to an elliptical shape, but a similar effect can be achieved also by forming the large opening in a rectangle having a major axis in the major axis direction of the pixel. In other words, if the through-hole 111 is a through-hole whose large opening 1112 has a major axis and a minor axis and the major axis extends in the longitudinal direction of the pixel, then a similar effect can be achieved.

In the present embodiment, the slit 1101 of the pixel electrode 110 is formed so as to extend to the inner wall of the through-hole 111. In this case, if optical alignment is used, then an orientation process can be carried out also for an orientation film formed in the through-hole 111. The optical orientation is an orientation process which provides uniaxial anisotropy to an orientation film by irradiating, for example, polarized ultraviolet rays on the orientation film. Accordingly, since also the inside of the through-hole 111 can be used as a region for formation of an image, the transmittance of the pixel can be improved.

[Embodiment 3]

Figure 5:
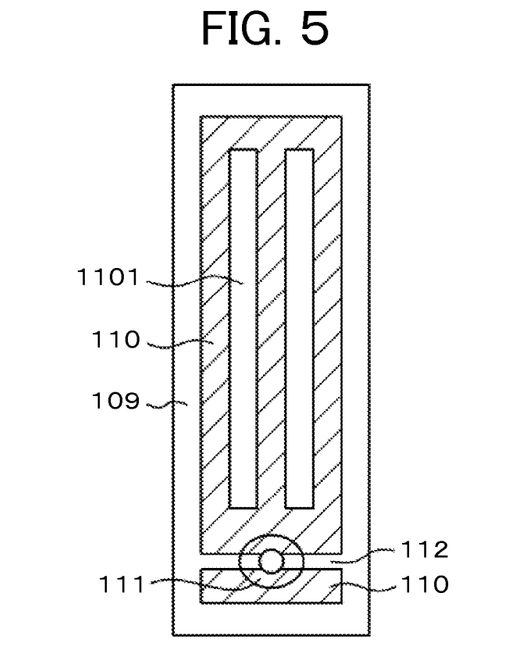
FIG. 5 is a top plan view of a pixel of a liquid crystal display device according to an embodiment 3.

FIG. 5 is a top plan view depicting a third embodiment of the present invention. The present embodiment is characterized in that a through-hole 111 has an elliptical shape having a major axis in the longitudinal direction of the pixel and besides a pixel electrode 110 is separated into a main pixel electrode having a slit 1101 and a sub pixel electrode disposed on the outer side of the pixel. A gap 112 is provided between the main pixel electrode and the sub pixel electrode.

On the major axis side of a large opening 1112 of the through-hole 111, the taper angle of the inner wall of the through-hole 111 is smaller. Further, on the major axis side of the large opening 1112 of the through-hole 111, ITO which configures the pixel electrode 110 does not exist, and SiN which configures an interlayer insulating film 109 is exposed. Further, at the gap 112 at which ITO does not exist, a step of the ITO is formed.

In particular, in the present embodiment, the pixel is structured such that an orientation film material is likely to flow into the through-hole 111 from three reasons that the taper angle of the through-hole 111 is smaller in the proximity of the major axis of the large opening 1112 of the through-hole 111, that the SiN which configures the interlayer insulating film 109 is exposed and that a step of the ITO is formed. Accordingly, irregularities of a screen arising from thickness irregularities of the orientation film material on periphery of the through-hole can be prevented.

It is to be noted that, in the configuration of the present embodiment, the shape of the large opening 1112 of the through-hole 111 is not limited to an elliptical shape, but a similar effect can be achieved also by forming the large opening in a rectangle having a major axis in the minor axis direction of the pixel. If more general terms are used, the large opening 1112 of the through-hole 111 in the present embodiment has a major axis and a minor axis in plan and the major axis direction of the large opening 1112 of the through-hole 111 coincides with the minor axis direction of the pixel.

Further, in the present embodiment, the gap 112 in FIG. 5 can be used also as a slit for formation of an image. This can improve the transmittance of the pixel.

[Embodiment 4]

Figure 6A:
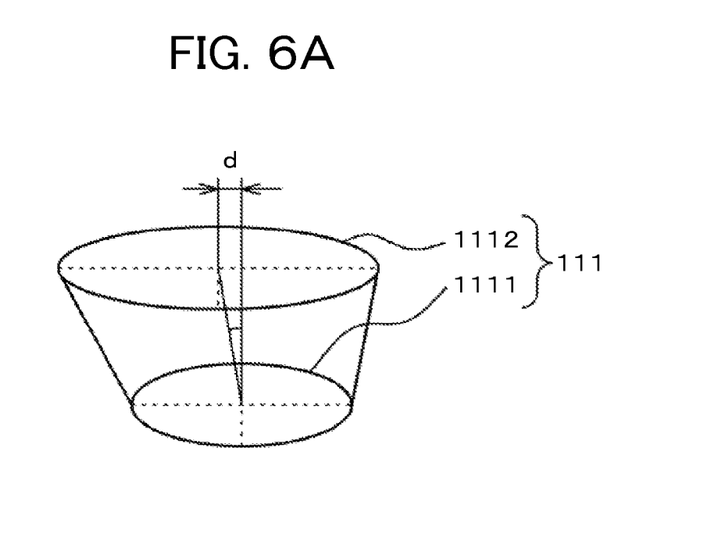
FIGS. 6A and 6B are a perspective view and a cross sectional view, respectively, of a through-hole according to an embodiment 4.
Figure 6B:
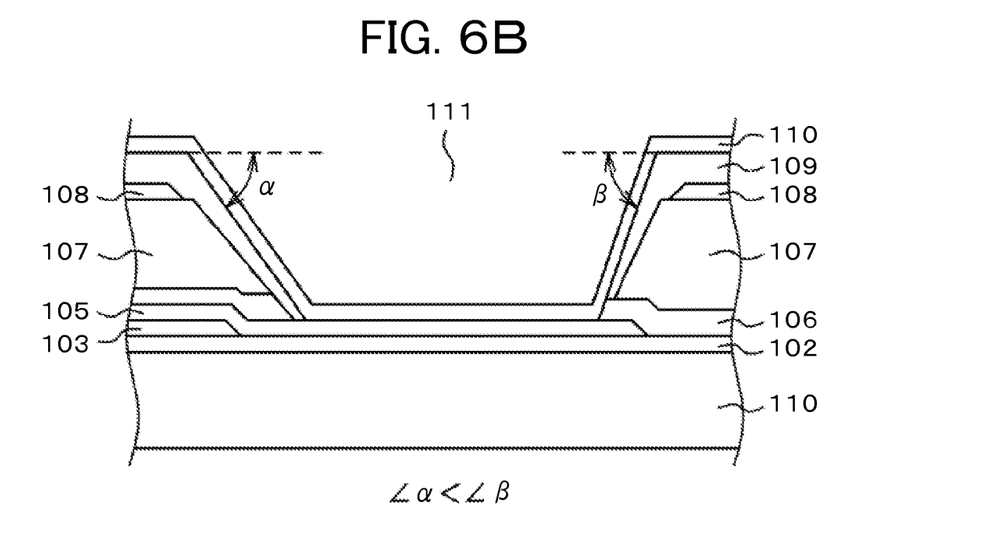

FIGS. 6A and 6B are views depicting a fourth embodiment of the present invention. In the present embodiment, the center of a large opening 1112 which is an upper bottom of a through-hole 111 and the center of a small opening 1111 which is a lower bottom of the through-hole 111 are displaced from each other to reduce the taper angle of the inner wall of the through-hole in one cross section of the through-hole 111.

FIG. 6A is a perspective view of the through-hole 111 depicting a characteristic of the present embodiment. Referring to FIG. 6A, the centers of the large opening 1112 and the small opening 1111 of the through-hole 111 are displaced from each other by a distance d. As a result, the taper angle of the left side of the through-hole in FIG. 6A is smaller than the taper angle of the right side of the through-hole. Since the orientation film material is more likely to flow into the through-hole where the taper angle of the through-hole 111 is smaller, an orientation film material flows into the through-hole 111 from the left side in FIG. 6A.

FIG. 6B is a cross sectional view of a through-hole region according to the present embodiment. Referring to FIG. 6B, the center of the small opening 1111 of the through-hole 111 is displaced in the rightward direction with respect to the center of the large opening 1112. Therefore, the taper angle α of the left side of the through-hole 111 is smaller than the taper angle β of the right side of the through-hole 111. Accordingly, the orientation film material becomes likely to flow into the through-hole 111 from the left side in FIG. 6B.

By forming a portion at which the orientation film material is more likely to flow into the through-hole 111 is formed on a periphery of the through-hole 111 in this manner, a phenomenon in which the orientation film material does not flow into the through-hole 111 can be prevented.

Since an organic passivation film 107 is as thick as 2 to 4 μm, in the shape of the through-hole 111, the shape of the through-hole formed in the organic passivation film 107 is dominant. In order to form such a through-hole 111 whose large opening 1112 and small opening 1111 are eccentric from each other as depicted in FIG. 6A or 6B, when the through-hole is formed in the organic passivation film 107, the centers of the large opening and the small opening may be displaced from each other.

In order to displace the centers of the large opening and the small opening of the through-hole formed in the organic passivation film 107 from each other, when the organic passivation film 107 is exposed to light, the side of the through-hole on which the taper angle is to be made smaller is exposed to light using half exposure. In particular, if it is assumed that the organic passivation film 107 is made of a photosensitive resin of the positive type, then a portion thereof upon which light is irradiated dissolves in developing solution. Accordingly, by controlling the exposure light amount on the side on which the taper angle of the through-hole is to be made smaller by half exposure, the amount by which the photosensitive resin is to dissolve in developing solution can be controlled in the depthwise direction.

Figure 7A:
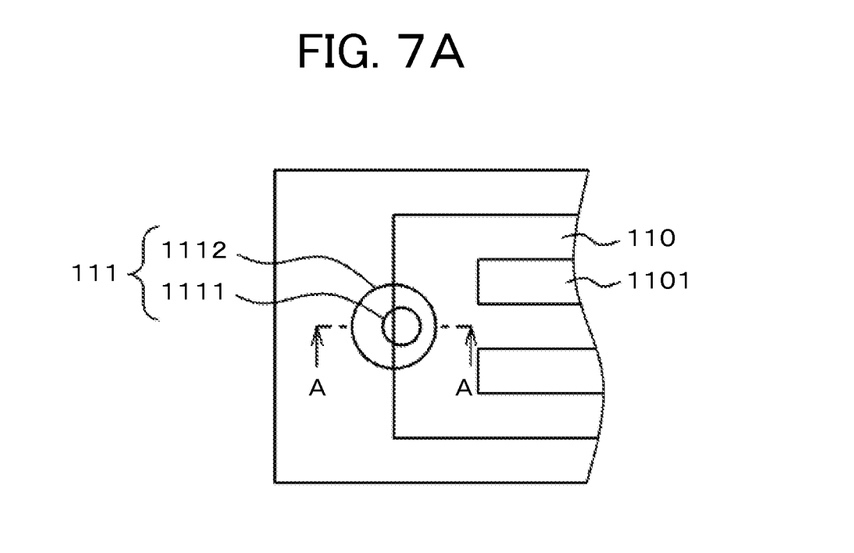
FIGS. 7A and 7B are a top plan view of a pixel and a cross sectional view of a through-hole, respectively, according to another form of the embodiment 4.
Figure 7B:
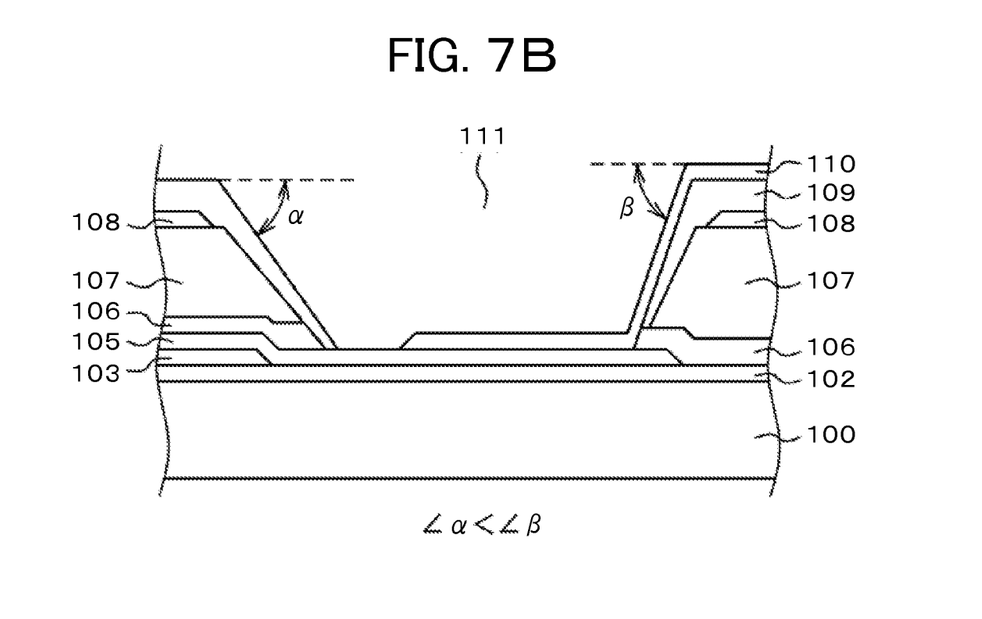

FIGS. 7A and 7B depict an example in which the eccentric direction of the large opening 1112 and the small opening 1111 of the through-hole 111 is defined. FIG. 7A is a top plan view. Referring first to FIG. 7A, the pixel electrode 110 is formed on one side of the through-hole 111, namely, on the inner side of the pixel, and the pixel electrode 110 is not formed on the other side of the through-hole 111, namely, on the outer side of the pixel. In FIG. 7A, the center of the small opening 1111 of the through-hole 111 is eccentric to the side of the pixel electrode 110 with respect to the center of the large opening 1112, or in other words, to the inner side of the pixel. Consequently, the taper angle of the through-hole 111 is smaller on the outer side of the pixel than on the inner side of the pixel. Accordingly, the orientation film material is more likely to flow into the through-hole 111 from the outer side of the pixel.

FIG. 7B is a sectional view taken along line A-A of FIG. 7A. Referring to FIG. 7B, the lamination structure up to an interlayer insulating film 109 is similar to that described hereinabove with reference to FIG. 14. Of the through-hole 111 of FIG. 7B, the taper angle α on the left side in FIG. 7B, namely, on the outer side of the pixel, is smaller than the taper angle β on the right side of FIG. 7B, namely, on the inner side of the pixel. Further, on the inner side of the pixel in the through-hole 111, the pixel electrode 110 extends on the inner wall and the bottom of the through-hole 111. However, on the outer side of the pixel in the through-hole 111, the pixel electrode 110 does not exist. In particular, from the facts that the taper angle α of the through-hole 111 is smaller on the outer side of the pixel and that the interlayer insulating film 109 made of SiN is exposed, the orientation film material is likely to flow into the through-hole 111 from the outer side of the pixel as described hereinabove with reference to FIG. 6A.

Although the liquid crystal display device includes a liquid crystal layer sandwiched between a TFT substrate 100 and a counter substrate, in order to keep the distance between the TFT substrate 100 and the counter substrate at a predetermined value, a post-like spacer 150 is formed, for example, on the counter electrode side. If this post-like spacer 150 exists in the region in which the through-hole 111 is formed, then the distance between the TFT substrate 100 and the counter substrate cannot be controlled.

Accordingly, in design, the post-like spacer 150 formed on the counter electrode is disposed avoiding the position of the through-hole 111 formed on the TFT substrate 100. However, in such a case that pressing force is applied to the counter substrate, a tip end of the post-like spacer 150 may possibly move and the post-like spacer 150 may possibly drop into the through-hole 111. In order to minimize the possibilities, preferably the position of the post-like spacer 150 and the position of the through-hole 111 are kept spaced from each other by a predetermined distance.

Figure 8:
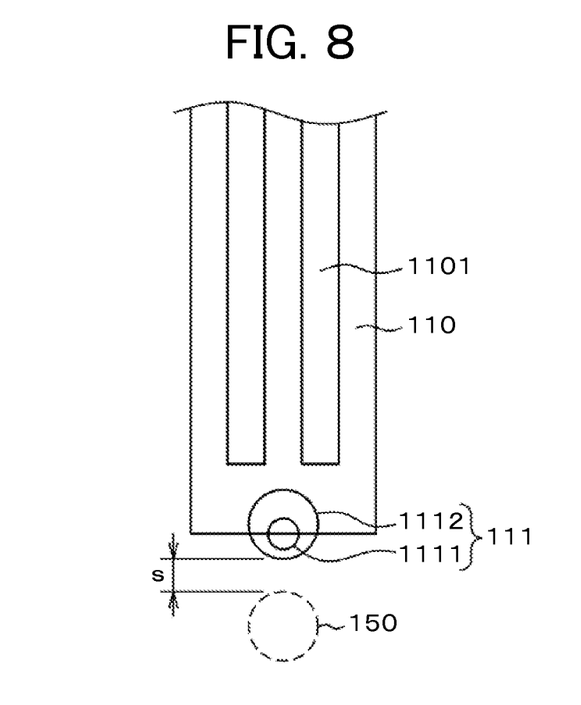
FIG. 8 is a top plan view of a pixel according to a further form of the embodiment 4.

In the through-hole 111 wherein the centers of the large opening 1112 and the small opening 1111 are displaced from each other, the small opening 1111 of the through-hole 111 must necessarily contact with the pixel electrode 110. FIG. 8 depicts a configuration wherein, where the position of the small opening 1111 is taken as a reference, the space s between the post-like spacer 150 and the large opening 1112 of the through-hole 111 is set as great as possible. In particular, the center of the large opening 1112 of the through-hole 111 is displaced to the inner side of the pixel in comparison with the center of the small opening 1111.

In other words, it can be considered that the center of the small opening 1111 of the through-hole 111 is displaced to the post-like spacer 150 side with respect to the center of the large opening 1112. Since such a configuration as just described makes it possible to assure a great space s between the large opening 1112 of the through-hole 111 and the post-like spacer 150, the possibility that the post-like spacer 150 may drop into the through-hole 111 can be reduced. Further, since a region in which the taper angle is small can be formed in the through-hole 111, flowing of the orientation film material into the through-hole 111 can be facilitated thereby to suppress occurrence of display irregularities.

Figure 9:
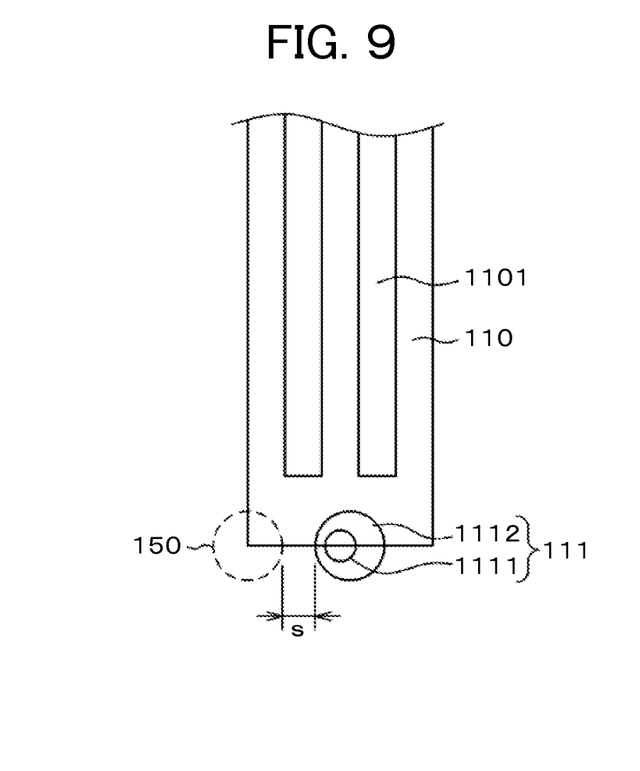
FIG. 9 is a top plan view of a pixel according a still further form of the embodiment 4.

FIG. 9 is a top plan view depicting the pixel electrode 110 in which the post-like spacer 150 is formed at a different position. Also in FIG. 9, the center of the small opening 1111 of the through-hole 111 is displaced toward a direction in which the post-like spacer 150 exists with respect to the center of the large opening 1112. Also in FIG. 9, the space s between the large opening 1112 of the through-hole 111 and the post-like spacer 150 can be assured great, and therefore, the probability that the post-like spacer 150 may drop into the through-hole 111 can be reduced. Further, since a region in which the taper angle is small can be formed in the through-hole 111, it is possible to facilitate flowing of the orientation film material into the through-hole 111 thereby to suppress occurrence of display irregularities.

In the display region, a large number of post-like spacers are formed. The post-like spacer 150 in FIGS. 8 and 9 signifies a post-like spacer 150 located nearest to the through-hole 111 of a target. If the contents depicted in FIGS. 8 and 9 are summarized, then it can be considered that the small opening 1111 of the through-hole 111 is displaced toward the post-like spacer 150 side with respect to the large opening 1112.

It is to be noted that, while it is described that, in the examples of FIGS. 6A to 9, both of the large opening 1112 and the small opening 1111 of the through-hole 111 have a circular transverse section, the shape of the large opening 1112 or the small opening 1111 of the through-hole 111 is not limited to a circular shape, but may be a rectangular shape or a hexagonal shape.

Figure 10:
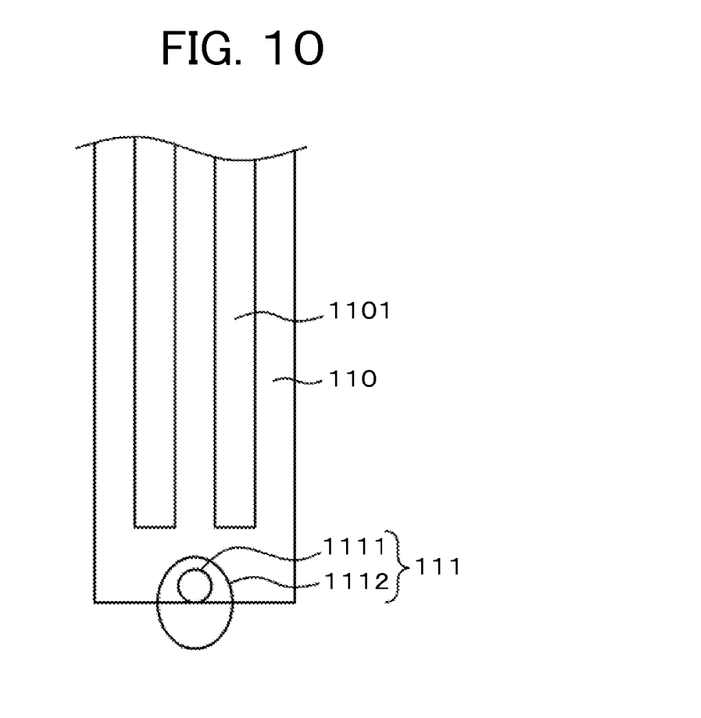
FIG. 10 is a top plan view of a pixel according a yet further form of the embodiment 4.

FIG. 10 is a top plan view of a pixel region depicting an example wherein the large opening 1112 of the through-hole 111 has an elliptical shape and the small opening 1111 of the through-hole 111 has a circular shape. Referring to FIG. 10, the center of the small opening 1111 of the through-hole 111 is displaced toward the inner side of the pixel with respect to the center of the large opening 1112 of an elliptical shape. If this configuration is applied, then the taper angle of the through-hole 111 can be made smaller on the outer side of the pixel of the through-hole. Accordingly, if the through-hole shape depicted in FIG. 10 is applied, then it is possible to facilitate flowing of the orientation film material into the through-hole further than flowing into the through-hole depicted in FIGS. 7A and 7B.

Figure 11:
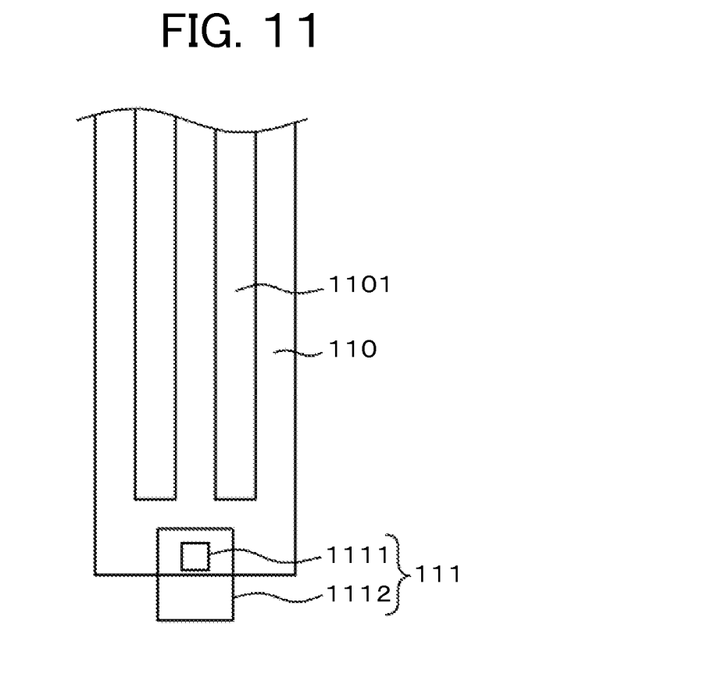
FIG. 11 is a top plan view of a pixel according a yet further form of the embodiment 4.

FIG. 11 depicts an example wherein the shape in plan of the large opening 1112 of the through-hole 111 is not an elliptical shape but a rectangular shape. In this case, the small opening 1111 of the through-hole 111 has a square shape. Also in the example of FIG. 11, the center of the small opening 1111 of the through-hole 111 is displaced toward the inner side of the pixel with respect to the center of the large opening 1112. Also with the through-hole 111 of the present example, it is possible to facilitate flowing of the orientation film material into the through-hole 111 similarly as in the case of FIG. 10 described hereinabove.

It is to be noted that the shape of the through-hole 111 is not limited to that of FIG. 10 or 11, but some other shape may be applied similarly. In particular, a similar effect to that achieved by the through-hole 111 depicted in FIG. 10 or 11 is achieved if the through-hole 111 is configured such that, in a shape in plan of the through-hole 111 formed in a rectangular pixel, the large opening 1112 of the through-hole 111 has a major axis coincident with the longitudinal direction of the pixel and a minor axis and the center of the small opening 1111 of the through-hole 111 is displaced toward the inner side of the pixel with respect to the center of the large opening 1112 of the through-hole 111.

Figure 12:
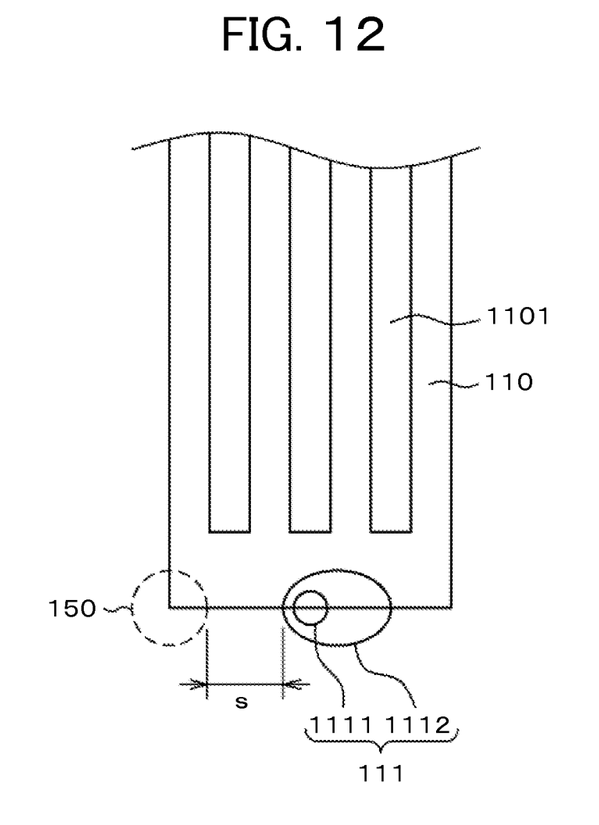
FIG. 12 is a top plan view of a pixel according a yet further form of the embodiment 4.

FIG. 12 depicts an example wherein the shape in plan of the large opening 1112 of the through-hole 111 in a case in which the position of the post-like spacer 150 is taken into consideration is an elliptical shape. In the through-hole 111 of FIG. 12, the center of the small opening 1111 is displaced toward the post-like spacer 150 side with respect to the center of the large opening 1112 of an elliptical shape. With the present configuration, the taper angle of the inner wall of the through-hole 111 on the opposite side to the post-like spacer 150 can be made small, and consequently, flowing of the orientation film material into the through-hole 111 can be facilitated. Further, with the configuration of FIG. 12, the space s between the post-like spacer 150 and the large opening 1112 of the through-hole 111 can be made great, and consequently, the possibility that the post-like spacer 150 may drop into the through-hole 111 can be reduced.

With the configuration depicted in FIG. 12, by forming the large opening 1112 of the through-hole 111 in an elliptical shape, both of the effect that the orientation film material flows easily into the through-hole 111 and the effect that the probability that the post-like spacer 150 may drop into the through-hole 111 can be reduced can be improved in comparison with the configuration depicted in FIG. 9.

It is to be noted that, although the shape of the large opening 1112 of the through-hole 111 in FIG. 12 is an elliptical shape, the shape of the large opening 1112 is not limited to this but may be a rectangular shape or some other shape. In particular, the large opening 1112 of the through-hole 111 may have any shape if, in the shape in plan of the large opening 1112, the large opening 1112 of the through-hole 111 has a major axis and a minor axis and the center of the small opening 1111 of the through-hole 111 is displaced toward the post-like spacer 150 side with respect to the center of the large opening 1112 of the through-hole 111. Further, the major axis of the large opening 1112 is directed so as to coincide with a direction of a line which connects the center of the large opening 1112 and the post-like spacer to each other. With such a configuration as just described, a similar effect to that achieved by the configuration of FIG. 12 can be achieved. Also the post-like spacer 150 in this case is the post-like spacer 150 nearest to the target through-hole 111.

Figure 13:
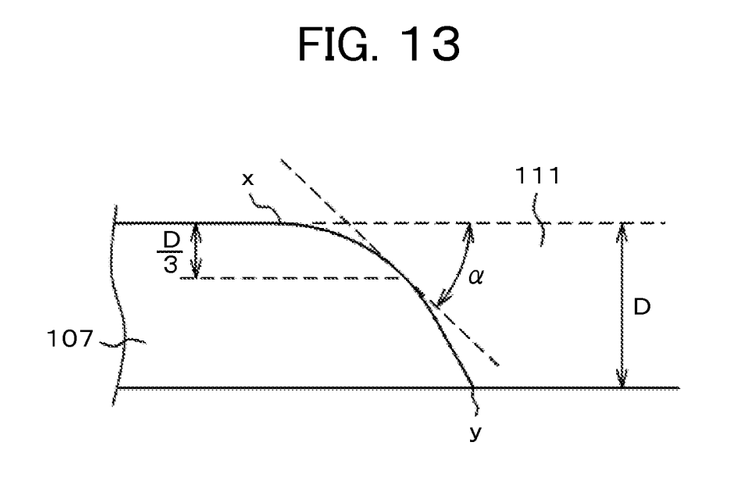
FIG. 13 is a view illustrating a definition of a sectional shape of a through-hole.

FIG. 13 depicts a cross sectional shape of the through-hole formed in the organic passivation film 107 from within the through-hole 111. Since the organic passivation film 107 is as thick as 2 to 4 µm, it may be considered that the cross sectional shape of the through-hole 111 is dominated by the cross sectional shape of the through-hole in the organic passivation film 107. Accordingly, the depth of the through-hole 111, the taper angle of the through-hole 111 or the like may be defined by the depth, taper angle or the like of the through-hole formed in the organic passivation film 107.

In FIG. 13, the depth of the through-hole of the organic passivation film 107 is represented by D. In this case, the diameter of the large opening of the through-hole is measured with reference to a position x at which a line on the top face of the organic passivation film and a cross section of the through-hole of the organic passivation film contact with each other. Further, the diameter of the small opening of the through-hole is measured with reference to a portion y at which the organic passivation film terminates.

Further, the taper angle α of the through-hole is an angle α defined by a tangential line to the inner wall of the through-hole at the position of D/3 from the upper face of the organic passivation film 107 and a line on the upper face of the through-hole. It can be considered that, as the angle α decreases, the orientation film material tends to flow into the through-hole more readily.

It is to be noted that, while the display device in the present specification is configured such that an interlayer insulating film is provided on a counter electrode and a pixel electrode is provided on the interlayer insulating film, the display device may be structured otherwise such that the positional relationship of the pixel electrode and the counter electrode is reversed. In this case, the counter electrode is sometimes connected to another electrode or a wiring line through a through-hole. Even in such a structure as just described, in order to allow the orientation film material to flow readily into the through-hole, the present invention may be applied to the counter electrode. Further, while the present application discloses a TFT of the bottom gate structure wherein a gate insulating film is provided on a gate electrode and a semiconductor layer is provided on the gate insulating film, the present invention can be applied also to a TFT of the top gate structure wherein the arrangement of the gate electrode and the semiconductor layer is reversed. Further, although the present invention is directed to a problem of a through-hole formed in an organic passivation film, a similar problem possibly occurs in such a case that, even with an inorganic insulating film, the taper angle is steep or in a like case. In such a case, the present invention can be applied to the through-hole of the inorganic insulating film. Further, while, in the configuration of FIG. 3, the interlayer insulating film 109 remains at a place from which ITO has been removed, the interlayer insulating film may be structured otherwise such that a taper portion of the through-hole and/or a peripheral portion of the through-hole thereof are removed.

What is claimed is:

1. A liquid crystal display device, comprising:
    a thin film transistor substrate including
        an organic passivation film,
        a common electrode formed on the organic passivation film,
        an interlayer insulating film formed on the common electrode,
        a pixel electrode formed on the interlayer insulating film and having therein a slit closed at an end portion thereof, and
        a pixel configured such that a source electrode of a thin film transistor and the pixel electrode are electrically connected to each other through a through-hole formed in the organic passivation film and the interlayer insulating film;
    a counter substrate; and
    liquid crystal sandwiched between the thin film transistor substrate and the counter substrate;
    wherein the through-hole has
        a large opening on the liquid crystal side,
        a small opening on the thin film transistor substrate side, and
        an inner wall extending between the large opening and the small opening;
    wherein a channel of the thin film transistor is covered by the organic passivation film,
    wherein the large opening has a first portion which is not covered by the pixel electrode, and a second portion which is covered by the pixel electrode; and
    wherein the inner wall corresponds to the first portion of the large opening is not covered by the pixel electrode.

2. A liquid crystal display device according to claim 1, comprising:
    a shape in plan of the large opening has a major axis and a minor axis; and
    wherein the pixel has a rectangular shape and the major axis of the large opening of the through-hole extends in a direction same as a direction of the major axis of the pixel, and the slit extends also to the inner wall of the through-hole.

3. A liquid crystal display device according to claim 1, comprising:
    a shape in plan of the large opening has a major axis and a minor axis;
    wherein the pixel electrode includes
        a main pixel electrode having the slit and
        a sub pixel electrode disposed so as to have a gap from the main pixel electrode;
    wherein the pixel has a rectangular shape and the major axis of the large opening of the through-hole extends in a direction same as a direction of the minor axis of the pixel; and
    wherein, in a region of the gap, a periphery of the large opening of the through-hole is not covered with the pixel electrode.

4. The liquid crystal display device according to claim 1, wherein the pixel electrode has a first end in a side of the through-hole,
    wherein the pixel has a second end in the side of the through-hole,
    wherein the first end is parallel to the second end, and across the large opening.

5. The liquid crystal display device according to claim 1, wherein the slit overlaps with the inner wall.

* * * * *